(12) United States Patent
Suzuki et al.

(10) Patent No.: US 10,413,885 B2
(45) Date of Patent: *Sep. 17, 2019

(54) EXHAUST GAS PURIFICATION CATALYST (71) Applicants: TOYOTA JIDOSHA KABUSHIKI KAISHA, Toyota-shi, Aichi (JP); CATALER CORPORATION, Kakegawa-shi, Shizuoka (JP)

(72) Inventors: Hiromasa Suzuki, Toyota (JP); Yoshinori Saito, Toyota (JP); Tatsuya Ohashi, Kakegawa (JP); Shunsuke Ohishi, Kakegawa (JP); Takaya Ota, Kakegawa (JP)

(73) Assignees: TOYOTA JIDOSHA KABUSHIKI KAISHA, Toyota-shi, Aichi-ken (JP); CATALER CORPORATION, Kakegawa-shi, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/151,847

(22) Filed: Oct. 4, 2018

(65) Prior Publication Data

US 2019/0105637 A1    Apr. 11, 2019

(30) Foreign Application Priority Data

Oct. 6, 2017   (JP) ................. 2017-195646

(51) Int. Cl.
  *B01J 23/44*   (2006.01)
  *B01J 35/00*   (2006.01)
  (Continued)

(52) U.S. Cl.
  CPC .......... *B01J 23/464* (2013.01); *B01D 53/945* (2013.01); *B01D 53/9468* (2013.01); *B01J 23/44* (2013.01);
  (Continued)

(58) Field of Classification Search
  CPC ..... B01J 23/44; B01J 23/464; B01L 35/0006; B01L 35/0066
  See application file for complete search history.

(56) References Cited

U.S. PATENT DOCUMENTS 6,047,544 A * 4/2000 Yamamoto ........... B01D 53/945
                                                    422/171
6,080,375 A * 6/2000 Mussmann ........... B01D 53/944
                                                    423/212

(Continued)

FOREIGN PATENT DOCUMENTS

JP        6-205983 A      7/1994
JP        2009-273986 A   11/2009
(Continued)

OTHER PUBLICATIONS

Office Action dated Oct. 4, 2018 from the United States Patent and Trademark Office in counterpart U.S. Appl. No. 15/936,980.

(Continued)

*Primary Examiner* — Cam N. Nguyen
(74) *Attorney, Agent, or Firm* — Sughrue Mion, PLLC (57) ABSTRACT

The exemplary embodiments relate to an exhaust gas purification catalyst that is excellent in terms of HC purification capacity and warm-up performance. Such exhaust gas purification catalyst comprises a substrate and a catalyst coating layer formed on the surface of the substrate, wherein the catalyst coating layer comprises an upper and lower layer comprising a lower layer being closer to the surface of the substrate and an upper layer being relatively remote from the surface of the substrate, the upper layer of the catalyst coating layer comprises Rh, Pd, and a carrier, the upper layer of the catalyst coating layer comprises an uppermost surface Pd layer having a Pd concentration relatively higher than that in any other portion in the upper layer within an area extending over a length of 20 mm or more from one end on (Continued)

the upstream side in the downstream direction on the surface of the upper layer, the lower layer of the catalyst coating layer comprises at least one noble metal selected from Pd and Pt and a carrier, and 60% or more of Pd by mass in the uppermost surface Pd layer exists in a layer up to 50% of the upper layer in a thickness direction from the surface of the uppermost surface Pd layer being relatively remote from the surface of the substrate.

4 Claims, 4 Drawing Sheets

(51) Int. Cl.
  *B01J 23/46* (2006.01)
  *B01D 53/94* (2006.01)
  *F01N 3/28* (2006.01)
(52) U.S. Cl.
  CPC ....... *B01J 35/0006* (2013.01); *B01J 35/0066* (2013.01); *F01N 3/28* (2013.01); *B01D 2255/1023* (2013.01); *B01D 2255/1025* (2013.01); *B01D 2255/9022* (2013.01); *F01N 2370/02* (2013.01)

(56) References Cited

U.S. PATENT DOCUMENTS

| | | | | |
|---|---|---|---|---|
| 7,517,510 | B2 * | 4/2009 | Chen | B01D 53/945 422/168 |
| 7,524,465 | B2 * | 4/2009 | Kumar | B01J 23/44 422/180 |
| 7,749,472 | B2 * | 7/2010 | Chen | B01D 53/945 423/213.2 |
| 7,998,896 | B2 * | 8/2011 | Kitamura | B01D 53/945 422/180 |
| 8,165,560 | B2 * | 4/2012 | Stenquist | G08B 25/016 379/106.02 |
| 8,168,560 | B2 | 5/2012 | Taki et al. | |
| 8,309,488 | B2 * | 11/2012 | Kitamura | B01D 53/945 502/304 |
| 8,663,588 | B2 * | 3/2014 | Lindner | B01D 53/945 423/213.5 |
| 8,796,172 | B2 * | 8/2014 | Chinzei | B01D 53/945 502/262 |
| 8,950,174 | B2 * | 2/2015 | Hilgendorff | B01J 23/58 423/213.2 |
| 9,242,242 | B2 * | 1/2016 | Hilgendorff | B01J 23/58 |
| 9,517,462 | B2 * | 12/2016 | Roesch | B01D 53/945 |
| 9,579,633 | B2 * | 2/2017 | Suzuki | B01D 53/9468 |
| 9,579,638 | B2 * | 2/2017 | Fedeyko | B01D 53/8628 |
| 9,993,804 | B2 * | 6/2018 | Saito | B01J 37/08 |
| 2014/0357480 | A1 | 12/2014 | Aoki | |
| 2018/0236401 | A1 * | 8/2018 | Chinzei | B01J 37/0244 |

FOREIGN PATENT DOCUMENTS

| | | |
|---|---|---|
| JP | 2012-40547 A | 3/2012 |
| JP | 2013-136032 A | 7/2013 |
| JP | 2016-513014 A | 5/2016 |
| JP | 2018-176109 A | 11/2018 |
| WO | 2014/132034 A1 | 9/2014 |

OTHER PUBLICATIONS

Notice of Allowance dated Jan. 23, 2019 from the United States Patent and Trademark Office in counterpart U.S. Appl. No. 15/936,980.

\* cited by examiner

EXHAUST GAS PURIFICATION CATALYST

CROSS REFERENCE TO RELATED APPLICATIONS

This application claims priority from Japanese patent application JP 2017-195646 filed on Oct. 6, 2017, the content of which is hereby incorporated by reference into this application.

BACKGROUND

Technical Field

Exemplary embodiments relate to an exhaust gas purification catalyst.

Background Art

An exhaust gas purification catalyst of an automobile oxidizes hydrocarbon (HC) and carbon monoxide (CO) contained in an exhaust gas discharged from an automobile engine, converts such substances into water and carbon dioxide, and reduces a nitrogen oxide (NOx) in an exhaust gas into nitrogen. As an exhaust gas purification catalyst having such catalytic activity (hereafter, it is also referred to as a "three-way catalyst"), in general, a noble-metal-carrying catalyst comprising a thermostable substrate coated with a catalyst layer comprising particles of catalytic noble metals, such as palladium (Pd), Rhodium (Rh), and platinum (Pt), is used.

For the future catalyst development, it is particularly desirable to improve HC purification in an A/F rich state and a high-SV region along with downsizing. There is a demand for catalysts specialized for HC. In addition, it is also desirable to improve warm-up performance of catalysts.

For example, JP 2013-136032 A discloses an exhaust gas purification catalyst comprising a substrate and a catalyst coating layer formed on the surface of the substrate. The catalyst coating layer is in the form of a layered structure having upper and lower layer with a lower layer being closer to the surface of the substrate and an upper layer being relatively remote from the surface of the substrate. The catalyst coating layer comprises Rh and Pd as noble metal catalysts, and it comprises a material having the oxygen storage capacity (OSC) as a carrier. Rh is disposed in the upper layer of the catalyst coating layer, and Pd is disposed in both the upper layer and the lower layer of the catalyst coating layer. In the upper layer and the lower layer, at least a part of Pd is carried on the OSC material, and a ratio of Pd disposed in the upper layer relative to Pd disposed in the lower layer by mass is not more than 0.4. With the use of the exhaust gas purification catalyst disclosed in JP 2013-136032 A, the oxygen storage capacity (OSC) of the whole catalyst is considered to be effectively improved without deteriorating the NOx purification capacity. However, it has been impossible to sufficiently utilize the HC purification capacity of Pd in the upper layer in which Pd and Rh are uniformly mixed. Therefore, the improvement of HC purification capacity has been awaited. Although there are conventional techniques concerning catalysts in which a catalyst metal such as Pd is disposed at a given site to improve specific performance (JP H6-205983 A, JP 2012-40547 A, and JP 2009-273986 A), realization of high HC purification capacity and warm-up performance in a well-balanced manner has not been achieved yet by these conventional techniques.

SUMMARY

Accordingly, the exemplary embodiments provide an exhaust gas purification catalyst that is excellent in terms of both HC purification capacity and warm-up performance.

The inventors of the exemplary embodiments have examined various means and, as a result, they discovered that an uppermost surface Pd layer having a given length extending from one end on the upstream side in the downstream direction on the upper layer of a catalyst, that is to say, a layer having a Pd concentration relatively higher than that in any other portion in the upper layer, is disposed on the surface of the upper layer, and a given amount of Pd is disposed in a layer up to 50% of the upper layer in a thickness direction from the surface of the uppermost surface Pd layer being relatively remote from the surface of the substrate (hereafter, it is also referred to as a "surface layer") on the upper layer of the catalyst, thereby making it possible to realize high HC purification capacity and warm-up performance in a well-balanced manner. This has led to the completion of the exemplary embodiments.

Specifically, the exemplary embodiments are summarized as follows.

[1] An exhaust gas purification catalyst comprising a substrate and a catalyst coating layer formed on the surface of the substrate, wherein the catalyst coating layer comprises an upper and lower layer comprising a lower layer being closer to the surface of the substrate and an upper layer being relatively remote from the surface of the substrate, the upper layer of the catalyst coating layer comprises Rh, Pd, and a carrier, the upper layer of the catalyst coating layer comprises an uppermost surface Pd layer having a Pd concentration relatively higher than that in any other portion in the upper layer within an area extending over a length of 20 mm or more from one end on the upstream side in the downstream direction on the surface of the upper layer, the lower layer of the catalyst coating layer comprises at least one noble metal selected from Pd and Pt, and a carrier, and 60% or more of Pd by mass in the uppermost surface Pd layer exists in a layer up to 50% of the upper layer in a thickness direction from the surface of the uppermost surface Pd layer being relatively remote from the surface of the substrate.

[2] The exhaust gas purification catalyst according to [1], wherein the upper layer of the catalyst coating layer comprises an uppermost surface Pd layer within an area extending over a length of 30 mm to 50 mm from one end on the upstream side in the downstream direction on the surface of the upper layer.

[3] The exhaust gas purification catalyst according to [1], wherein 80% or more of Pd by mass in the uppermost surface Pd layer exists in a layer up to 50% of the upper layer in a thickness direction from the surface of the uppermost surface Pd layer being relatively remote from the surface of the substrate.

[4] The exhaust gas purification catalyst according to [2], wherein 80% or more of Pd by mass in the uppermost surface Pd layer exists in a layer up to 50% of the upper layer in a thickness direction from the surface of the uppermost surface Pd layer being relatively remote from the surface of the substrate.

The exhaust gas purification catalyst according to the exemplary embodiments is excellent in the HC purification capacity and in the warm-up performance.

DETAILED DESCRIPTION

Hereafter, the exemplary embodiments are described in detail.

In this specification, features of the exemplary embodiments are described with reference to relevant drawings. In the drawings, dimensions and configurations of components are exaggerated for clarification, and actual dimensions and configurations are not accurately demonstrated. Accordingly, the technical scope of the exemplary embodiments is not limited to the dimensions and the configurations of the components demonstrated in the drawings.

The exemplary embodiments relate to an exhaust gas purification catalyst. Specifically, the exemplary embodiments relate to an exhaust gas purification catalyst comprising a substrate and a catalyst coating layer formed on the surface of the substrate, wherein the catalyst coating layer comprises an upper and lower layer comprising a lower layer being closer to the surface of the substrate and an upper layer being relatively remote from the surface of the substrate, the upper layer of the catalyst coating layer comprises Rh, Pd, and a carrier, the upper layer of the catalyst coating layer contains Rh, Pd, and a carrier, the upper layer of the catalyst coating layer comprises an uppermost surface Pd layer having a Pd concentration relatively higher than that in any other portion in the upper layer within an area extending over a length of 20 mm or more from one end on the upstream side in the downstream direction on the surface of the upper layer, the lower layer of the catalyst coating layer comprises at least one noble metal selected from Pd and Pt and a carrier, 60% or more of Pd by mass in the uppermost surface Pd layer exists in a layer (surface layer) up to 50% of the uppermost surface Pd layer in a thickness direction from the surface of the uppermost surface Pd layer being relatively remote from the surface of the substrate (hereinafter also referred to as "the catalyst of the exemplary embodiments"). The proportion of Pd existing in the surface layer can be determined by observing a portion of the catalyst coating layer, in which the uppermost surface Pd layer exists, using FE-EPMA, conducting Pd line analysis of a cross section of the catalyst coating layer in a thickness direction, and comparing the amount of Pd in the uppermost surface Pd layer and the amount of Pd existing in the upper half of the upper layer obtained by multiplying the amount of the Pd existing in the layer up to 50% of the upper layer in a thickness direction from the surface. The value of this proportion is 100% when the thickness of the uppermost surface Pd layer is thinner than 50% of the thickness of the upper layer (surface layer), or less than 100% when the thickness of the uppermost surface Pd layer is thicker than 50% of the thickness of the upper layer (surface layer). Note that since Pd is uniformly distributed with respect to the thickness of the upper layer according to the Background art, the proportion of the amount of Pd existing in a layer up to 50% of the upper layer in a thickness direction is 50%. The inventors of the exemplary embodiments have found that it is possible to reduce HC discharge and improve warm-up performance by disposing Pd having high HC purification activity when the air-fuel ratio of the gas is rich in a catalyst surface layer which sufficiently contacts with a gas, and further, it is possible to realize high levels of HC purification capacity and warm-up performance by controlling the width of the uppermost surface Pd layer disposed on the upstream side. The "width" of the catalyst layer means a "length" of the catalyst layer in the direction along the flow of an exhaust gas. According to the catalyst of the exemplary embodiments, since the uppermost surface Pd layer having a specific width is disposed on the upstream side, formation of an alloy of Pd and Rh can be prevented. In addition, according to the catalyst of the exemplary embodiments, since the uppermost surface Pd layer is disposed on the upstream side of the surface layer which sufficiently contacts with a gas, oxygen storage/release is likely to occur even at low temperatures in a region with a small A/F variation, thereby improving performance of the catalyst as an exhaust gas purification catalyst.

Figure 1:
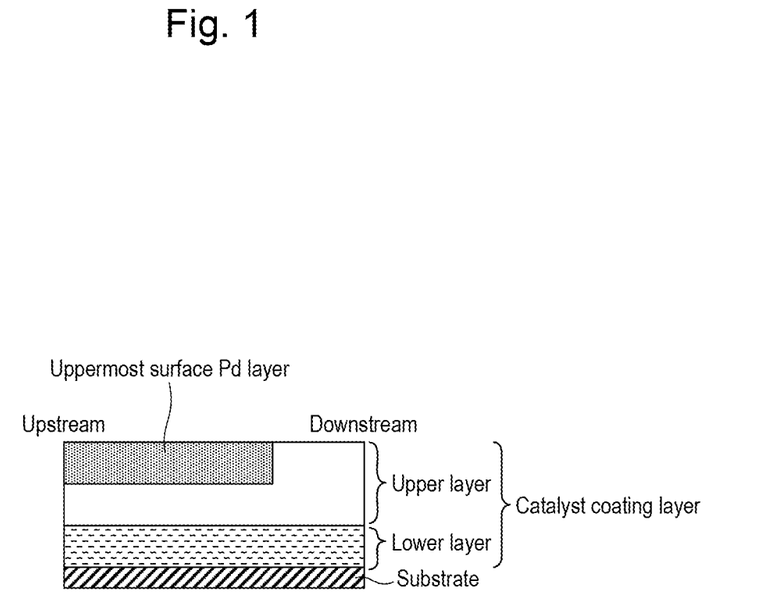
FIG. 1 shows one exemplary embodiment.

FIG. 1 schematically shows an embodiment of the catalyst of the exemplary embodiments. The catalyst of the exemplary embodiments comprises a substrate and a catalyst coating layer formed on the surface of the substrate. The catalyst coating layer comprises an upper and lower layer comprising a lower layer being closer to the surface of the substrate and an upper layer being relatively remote from the surface of the substrate, and the upper layer comprises an uppermost surface Pd layer containing Pd from one end on the upstream side in the downstream direction on a specific area of the upper layer.

The catalyst of the exemplary embodiments comprises a substrate and a catalyst coating layer formed on the surface of the substrate. The substrate is preferably in a honeycomb, pellet, or particle form, and it is more preferably a monolith substrate of a honeycomb structure. In addition, the substrate preferably comprises a thermostable inorganic matter such as cordierite or metal. With the use of a substrate having features described above, the exhaust gas purification capacity can be exerted at high temperatures. The wording "per liter of the substrate volume" used herein refers to an amount relative to a bulk volume of 1 liter of the whole including the pure volume of the substrate and the volume of a cell pathway.

Regarding the catalyst of the exemplary embodiments, the catalyst coating layer comprises an upper and lower layer comprising a lower layer being closer to the surface of the substrate and an upper layer being relatively remote from the surface of the substrate, the upper layer of the catalyst coating layer comprises Rh and Pd, and a carrier, and the lower layer of the catalyst coating layer comprises at least one noble metal selected from Pd and Pt and a carrier. The upper layer is preferably the uppermost layer of the catalyst coating layer, and the upper layer is preferably in contact with the lower layer. In addition, the upper layer of the catalyst coating layer comprises an uppermost surface Pd layer containing Pd within an area extending over a length of 20 mm or more from one end on the upstream side in the downstream direction on the surface of the upper layer. Pd and Pt mainly contributes to carbon monoxide (CO) and hydrocarbon (HC) purification capacity (oxidation purification capacity). Rh mainly contributes to NOx purification capacity (reduction purification capacity).

In the catalyst of the exemplary embodiments, the lower layer of the catalyst coating layer comprises at least one noble metal selected from Pd and Pt and a carrier. The lower layer of the catalyst coating layer may comprise other noble metals, such as ruthenium (Ru), iridium (Ir), osmium (Os), or rhodium (Rh), provided that performance of Pd or Pt is not adversely affected.

A carrier to be incorporated into the lower layer is not particularly limited, provided that such carrier can be used for a common exhaust gas purification catalyst. For example, an OSC material having the oxygen storage capacity as disclosed in JP 2013-136032 A is preferably used as a carrier. When the air-fuel ratio of an exhaust gas is lean (i.e., a hyperoxic atmosphere), an OSC material stores oxygen in the exhaust gas. When the air-fuel ratio of an exhaust gas is rich (i.e., an excess fuel atmosphere), in contrast, an OSC material discharges the stored oxygen. Examples of such OSC materials include cerium oxide (ceria: $CeO_2$) and a composite oxide containing ceria, such as a ceria-zirconia composite oxide (a $CeO_2$—$ZrO_2$ composite oxide). When the lower layer contains Pd, barium (Ba) may be added to the carrier. With the addition of Ba to the carrier of the lower layer, poisoning of Pd by HC can be suppressed, and catalytic activity can be enhanced. A material with a high specific surface area is preferably also used since the carrier comprises a noble metal such as Pd carried thereon.

A total content of at least one noble metal selected from Pd and Pt in the lower layer is not particularly limited, provided that sufficient catalytic activity is achieved, and a necessary amount thereof can be added.

The lower layer may be formed by coating the surface of the substrate (e.g., a honeycomb substrate) with a slurry containing carrier particles and allowing Pd or the like to be carried thereon. Alternatively, the substrate surface may be coated with a slurry containing catalyst powders of Pd or the like carried on the carrier particles.

A noble metal such as Pd may be carried on the carrier of the lower layer by any method without particular limitation. For example, carrier particles containing OSC materials may be impregnated with an aqueous solution containing palladium salt (e.g., nitrate salt) or a palladium complex (e.g., a tetraamine complex).

In the step of forming the lower layer via coating, the slurry preferably contains a binder so as to adequately adhere the slurry to the substrate surface. A binder, such as alumina sol or silica sol, is preferably used. Slurry viscosity is adequately adjusted, so that the slurry can easily flow into cells of the substrate (e.g., a honeycomb substrate).

While the amount of the lower layer formed (i.e., the amount of coating) is not particularly limited, for example, such amount is preferably about 20 g to 200 g per liter of the substrate volume. Thus, the carried noble metal particles can be prevented from growing, and an increase in pressure loss occurring when an exhaust gas passes through the cells of the substrate can be prevented.

The coating width of the lower layer is not particularly limited. For example, it may be not less than 20 mm from one end on the upstream side in the downstream direction and not more than the full length of the substrate.

While the conditions for drying the slurry applied on the substrate surface vary depending on the configuration and the dimensions of the substrate or carrier, typically, drying is carried out at about 80° C. to 150° C. (e.g., 100° C. to 130° C.) for about 1 to 10 hours and calcining is carried out at about 300° C. to 800° C. (e.g., 400° C. to 600° C.) for about 1 to 4 hours.

Regarding the catalyst of the exemplary embodiments, the upper layer of the catalyst coating layer comprises Rh and Pd, and a carrier. The upper layer of the catalyst coating layer may comprise other noble metals, such as platinum (Pt), ruthenium (Ru), iridium (Ir), and osmium (Os), provided that performance of Rh and Pd is not adversely affected. Any portion other than the uppermost surface Pd layer described later may consist of Rh or contain Pd in addition to Rh.

A carrier to be incorporated into the upper layer is not particularly limited, provided that it can be used for a common exhaust gas purification catalyst. For example, ceria ($CeO_2$), zirconia ($ZrO_2$), alumina ($Al_2O_3$), a solid solution thereof, or a composite oxide thereof as disclosed in JP 2013-136032 A is preferably used as a carrier. For example, it is preferably a $ZrO_2$-containing carrier. Rh carried on $ZrO_2$ generates hydrogen from HC in the exhaust gas through a hydrogen reforming reaction. Because of the reduction power of hydrogen, NOx in the exhaust gas is purified more sufficiently. A carrier to be incorporated into the upper layer of the catalyst coating layer may comprise a carrier material other than a $ZrO_2$ composite oxide. Examples of carrier materials preferably include metal oxides that are porous and thermostable. For example, $Al_2O_3$ is preferably used. $Al_2O_3$ has a larger specific area and higher tolerance (thermostability, in particular), compared with a $ZrO_2$ composite oxide. By allowing Rh to be carried on $Al_2O_3$, accordingly, thermostability of the entire carrier can be improved, and an adequate amount of Rh can be carried on the entire carrier.

The upper layer may be formed by coating the surface of the lower layer with a slurry containing a carrier powder and allowing Rh or the like to be carried thereon. Alternatively, the surface of the lower layer may be coated with a slurry containing a catalyst powder prepared by allowing a carrier powder to carrying Rh or the like.

A noble metal such as Rh may be carried on the carrier of the upper layer by any method without particular limitation. For example, a carrier powder may be allowed to be impregnated with an aqueous solution containing a rhodium salt (e.g., nitrate salt) or a rhodium complex (e.g., a tetraamine complex).

In the step of forming the upper layer via coating, the slurry preferably contains a binder so as to adequately adhere the slurry to the surface of the lower layer. A binder, such as alumina sol or silica sol, is preferably used. Slurry viscosity is adequately adjusted, so that the slurry can easily flow into cells of the substrate (e.g., a honeycomb substrate).

While the amount of the upper layer formed (i.e., the amount of coating) is not particularly limited, for example, such amount is preferably about 20 g to 200 g per liter of the substrate volume. Thus, the carried Rh and Pd particles can be prevented from growing, and an increase in pressure loss occurring when an exhaust gas passes through the cells of the substrate can be prevented.

The coating width of the upper layer is not particularly limited as long as it is not less than the width of the uppermost surface Pd layer. For example, it may be not less than 20 mm from one end on the upstream side in the downstream direction and not more than the full length of the substrate.

While the conditions for drying the slurry applied on the lower layer surface vary depending on the configuration and the dimensions of the substrate or carrier, typically, drying is carried out at about 80° C. to 150° C. (e.g., 100° C. to 130° C.) for about 1 to 10 hours and calcining is carried out at about 300° C. to 800° C. (e.g., 400° C. to 600° C.) for about 1 to 4 hours.

In the catalyst of the exemplary embodiments, the upper layer of the catalyst coating layer comprises an uppermost surface Pd layer having a Pd concentration relatively higher than that in any other portion in the upper layer within an area extending over a length of 20 mm or more from one end on the upstream side in the downstream direction on the surface of the upper layer. The width of the uppermost surface Pd layer is preferably in a range of 30 mm to 50 mm from one end on the upstream side in the downstream direction in view of the achievement of high HC purification capacity and warm-up performance in a well-balanced manner. The width of the uppermost surface Pd layer is preferably in a range of 20 mm to 50 mm from one end of the upstream side in the downstream direction in view of the improvement of warm-up performance. The width of the uppermost surface Pd layer is preferably in a range of 30 mm or more from one end of on the upstream side in the downstream direction in view of the improvement of HC purification capacity. Further, the width of the uppermost surface Pd layer is in a range of preferably 20% or more, more preferably 30% to 80%, and further preferably 35% to 65% of the full length of the substrate from one end on the upstream side in the downstream direction in view of the achievement of high HC purification capacity and warm-up performance in a well-balanced manner.

The uppermost surface Pd layer may be formed by a method comprising coating the surface of the lower layer with the upper layer as described above, drying and calcining the coating, and allowing the resultant to absorb an aqueous solution containing a palladium salt (e.g., nitrate salt) or a palladium complex (e.g., a tetraamine complex), thereby allowing Pd to be carried. Pd may be carried on the upper layer surface via coating, impregnation, spraying, or other means. Any method is available as long as a region in which a Pd concentration relatively higher than that in any other portion in the upper layer is formed as an uppermost surface Pd layer. An aqueous solution of Pd can be prepared with the addition of nitric acid to a Pd solution (an acid species is not limited and acetic acid, citric acid, or the like may also be added). The amount of Pd carried on the upper layer can be adjusted by adequately regulating a pH level of the aqueous solution of Pd. In general, adsorption of Pd to the material constituting the upper layer is inhibited by lowering a pH level, and the aqueous solution of Pd can penetrate deep in the upper layer when lowering a pH level of the aqueous solution of Pd to less than 1. Accordingly, the uppermost surface Pd layer that is formed deep inside of the upper layer can carry Pd in a manner such that about 60% to 65% of Pd by mass in the uppermost surface Pd layer can exist in the surface layer. When the pH level of the aqueous solution of Pd is regulated within a range from 1 to 2, adsorption of Pd to the material constituting the upper layer is not inhibited. As a consequence, the uppermost surface Pd layer that is formed to reach even a shallow portion in the upper layer as compared with the case where pH is 1 or less can carry Pd in a manner such that about 80% to 85% of Pd by mass in the uppermost surface Pd layer can be disposed in the surface layer.

While the conditions for drying the uppermost surface Pd layer vary depending on the configuration and the dimensions of the substrate or carrier, typically, drying is carried out at about 80° C. to 150° C. (e.g., 100° C. to 130° C.) for about 1 to 10 hours and calcining is carried out at about 300° C. to 800° C. (e.g., 400° C. to 600° C.) for about 1 to 4 hours.

In order to improve the HC purification capacity and the warm-up performance, the catalyst of the exemplary embodiments comprises, in the upper layer, 60% by mass or more, preferably 80% by mass or more, and for example, 80% to 95% by mass or less of Pd contained in the uppermost surface Pd layer. The amount of Pd in the surface layer can be determined by measuring the PGM distribution in the upper layer of the catalyst coating layer with the use of a field-emission electron probe microanalyzer (FE-EPMA). For example, such amount can be determined by the method described in the section [II-1. Physical property evaluation] below. Here, the expression "Pd contained in the uppermost surface Pd layer" means Pd that is added when forming the uppermost surface Pd layer, and in some cases, Pd existing in the uppermost surface Pd layer, which is a part of Pd added when forming the upper layer. The uppermost surface Pd layer in the upper layer and a portion other than the uppermost surface Pd layer in the upper layer can be distinguished by measuring distributions of elements in coating materials of the upper layer and a distribution of Pd by FE-EPMA and specifying the depth of the upper layer and the depth of a Pd-containing portion of the upper layer.

The Pd content in the uppermost surface Pd layer is preferably 0.05 g/l to 30 g/l and more preferably 0.1 g/l to 12 g/l in order to achieve sufficient catalytic activity. It is the substrate volume corresponding to the width of the uppermost surface Pd layer, that is to say, a density of carried catalyst particles calculated based on the volume of a portion including the uppermost surface Pd layer of the substrate other than a portion including no uppermost surface Pd layer and the amount of carried Pd.

The catalyst of the exemplary embodiments can exert high purification capacity when uptake of air during, for example, acceleration is large, and specifically, when the amount of Ga is preferably 20 g/s to 100 g/s and more preferably 35 g/s to 100 g/s. In addition, the catalyst of the exemplary embodiments can exert high purification capacity when the air-fuel ratio (A/F) is rich, and specifically, when A/F is preferably 13.5 to 14.6 and more preferably 14.0 to 14.6.

The catalyst of the exemplary embodiments provides an HC purification ratio at 500° C. of preferably 79.0% or higher, and more preferably 83.2% or higher, after the tolerance test. In addition, for the catalyst of the exemplary embodiments, the time required for achieving a HC purification rate of 50% is preferably 15.0 seconds or less and more preferably 13.7 seconds or less after the tolerance test. Here, these values can be determined by, for example, the method described in the section [II-3. Property evaluation] below.

The "tolerance test" is carried out by exposing a catalyst or the like, which is a test subject, to the exhaust gas atmosphere resulting from combustion of a mixed gas or the gas atmosphere having a gas composition simulating such exhaust gas at about 800° C. to 1,100° C. for 1 to 70 hours. In general, the "tolerance test" is carried out to evaluate tolerance of an exhaust gas purification catalyst. The "tolerance test" can be carried out by, for example, the method described in the section [II-2. Tolerance test] below.

EXAMPLES

Hereafter, the exemplary embodiments are described in greater detail with reference to the following examples, although the technical scope of the exemplary embodiments is not limited to these examples.

<1. Preparation of Catalyst>

[I-1. Raw Materials]

(1) Raw materials used as carriers are as described below.

Material 1 ($Al_2O_3$)

An $La_2O_3/Al_2O_3$-composite was used ($La_2O_3$: 1 wt % to 10 wt %).

Material 2 (ACZ)

An $Al_2O_3$—$CeO_2$—$ZrO_2$ composite oxide was used ($CeO_2$: 15 wt % to 30 wt %), which was made highly thermostable with the addition of very small amounts of $Nd_2O_3$, $La_2O_3$, and $Y_2O_3$.

Material 3 (CZ)

A $CeO_2$—$ZrO_2$ composite oxide was used. From the viewpoint of OSC properties, 1 wt % to 10 wt % of $Pr_2O_3$ was added thereto.

(2) The following was used as a substrate:

a 700-cc cordierite honeycomb substrate (a 600-cell hexagonal substrate; wall thickness: 2 mil) (substrate length: 84 mm).

[I-2. Preparation of Catalyst]

Catalysts (bilayer catalysts) of Comparative Examples 1 to 5 and Examples 1 to 6 were prepared in the following manner.

Comparative Example 1

Lower-layer Pd layer: Pd (0.5)/ACZ (50)+$Al_2O_3$ (45)+Ba sulfate (5)

Upper-layer Rh layer: Rh (0.4)/ACZ (60)+$Al_2O_3$ (30)+CZ (10)

A suspension [Slurry 1] was prepared by introducing Pd nitrate, $Al_2O_3$(Material 1), ACZ (Material 2), Ba sulfate, and an $Al_2O_3$-based binder. Further, the prepared [Slurry 1] was introduced into the substrate, and unnecessary components were blown away using a blower to coat the wall surface of the substrate with the materials. The amounts of coating materials were adjusted as follows relative to the substrate volume: 0.5 g/l of Pd, 45 g/l of $Al_2O_3$ (Material 1), 50 g/l of ACZ (Material 2), and 5 g/l of Ba sulfate. Thus, a lower-layer Pd layer was formed. In the end, the resultant was dried in a dryer maintained at 120° C. for 2 hours and then calcined in an electric furnace at 500° C. for 2 hours.

A suspension [Slurry 2] was prepared by introducing Rh nitrate, $Al_2O_3$(Material 1), ACZ (Material 2), CZ (Material 3), and an $Al_2O_3$-based binder. The prepared [Slurry 2] was introduced into the substrate coated with the lower-layer Pd layer, and unnecessary components were blown away using a blower to coat the surface of the lower-layer Pd layer with the materials. The amounts of coating materials were adjusted as follows relative to the substrate volume: 0.4 g/l of Rh, 30 g/l of $Al_2O_3$(Material 1), 60 g/l of ACZ (Material 2), and 10 g/l of CZ. Thus, an upper-layer Rh layer was formed. In the end, the resultant was dried in a dryer maintained at 120° C. for 2 hours and then calcined in an electric furnace at 500° C. for 2 hours.

Comparative Example 2

Lower-layer Pd layer: Pd (0.5)/ACZ (50)+$Al_2O_3$ (45)+Ba sulfate (5)

Upper-layer Rh layer: Rh (0.4)/ACZ (60)+$Al_2O_3$ (30)+CZ (10)+Pd (2.6 g/l (the carried catalyst density calculated based on the substrate as a whole; the same applies below)) (Pd in the upper layer on the upstream side of exhaust gas: 11 g/l-20 mm from one end on the upstream side (the carried catalyst density calculated based on the substrate volume of a portion with a length of 20 mm or less carrying Pd is described as above; the same applies below))

In the step of forming the upper-layer Rh layer in Comparative Example 1, a suspension [Slurry 3] was prepared by introducing Rh nitrate, Pd nitrate, $Al_2O_3$(Material 1), ACZ (Material 2), CZ (Material 3), and an $Al_2O_3$-based binder. The [Slurry 3] was introduced from one end on the exhaust gas upstream side of the substrate coated with the lower-layer Pd layer, and unnecessary components were blown away using a blower to coat the surface of the lower-layer Pd layer with the materials. At such time, the coating length was adjusted to 20 mm relative to the substrate length. Thereafter, the [slurry 2] was used for forming a coating having a length of 64 mm from one end on the exhaust gas downstream side of the substrate. The amounts of coating materials were adjusted as follows relative to the substrate volume: 0.4 g/l of Rh, 2.6 g/l of Pd, 30 g/l of $Al_2O_3$(Material 1), 60 g/l of ACZ (Material 2), and 10 g/l of CZ (Material 3). Thus, an upper-layer Rh layer was formed. In the end, the resultant was dried in a dryer maintained at 120° C. for 2 hours and then calcined in an electric furnace at 500° C. for 2 hours.

At such time, the amount of Pd disposed on the exhaust gas upstream side of the upper-layer Rh layer was 11 g/l-20 mm. Note that since Pd is uniformly present within an area extending over a length of 20 mm from one end on the exhaust gas upstream side of the upper-layer Rh layer, the proportion of the amount of Pd existing in a layer up to 50% of the upper layer in a thickness direction from the surface of the upper layer being relatively remote from the surface of the substrate is 50% by mass.

Comparative Example 3

Lower-layer Pd layer: Pd (0.5)/ACZ (50)+$Al_2O_3$ (45)+Ba sulfate (5)

Upper-layer Rh layer: Rh (0.4)/ACZ (60)+$Al_2O_3$ (30)+CZ (10)+Pd (2.6 g/l) (Pd on the exhaust gas upstream side in the upper layer: 4.9 g/l-45 mm from one end on the upstream side)

In the step of forming an upper-layer Rh layer in Comparative Example 1, a suspension [Slurry 4] was prepared by introducing Rh nitrate, Pd nitrate, $Al_2O_3$(Material 1), ACZ (Material 2), CZ (Material 3), and an $Al_2O_3$-based binder. The [Slurry 4] was introduced from one end on the exhaust gas upstream side of the substrate coated with the lower-layer Pd layer, and unnecessary components were blown away using a blower to coat the surface of the lower-layer Pd layer with the materials. At such time, the coating length was adjusted to 45 mm relative to the substrate length. Thereafter, the [slurry 2] was used for forming a coating having a length of 39 mm from one end on the exhaust gas downstream side of the substrate. The amounts of coating materials were adjusted as follows relative to the substrate volume: 0.4 g/l of Rh, 2.6 g/l of Pd, 30 g/l of $Al_2O_3$(Material 1), 60 g/l of ACZ (Material 2), and 10 g/l of CZ (Material 3). Thus, an upper-layer Rh layer was formed. In the end, the resultant was dried in a dryer maintained at 120° C. for 2 hours and then calcined in an electric furnace at 500° C. for 2 hours.

At such time, the amount of Pd disposed on the exhaust gas upstream side of the upper-layer Rh layer was 4.9 g/l-45 mm. Note that since Pd is uniformly present within an area extending over a length of 45 mm from one end on the exhaust gas upstream side of the upper-layer Rh layer, the proportion of the amount of Pd existing in a layer up to 50% of the upper layer in a thickness direction from the surface of the upper layer being relatively remote from the surface of the substrate is 50% by mass.

Comparative Example 4

Lower-layer Pd layer Pd (0.5)/ACZ (50)+Al$_2$O$_3$ (45)+Ba sulfate (5)

Upper-layer Rh layer: Rh (0.4)/ACZ (60)+Al$_2$O$_3$ (30)+CZ (10)+Pd (2.6 g/l) (Pd on the exhaust gas upstream side in the upper layer: 3.3 g/l-67 mm from one end on the upstream side)

In the step of forming an upper-layer Rh layer in Comparative Example 1, a suspension [Slurry 5] was prepared by introducing Rh nitrate, Pd nitrate, Al$_2$O$_3$(Material 1), ACZ (Material 2), CZ (Material 3), and an Al$_2$O$_3$-based binder. The [Slurry 5] was introduced from one end on the exhaust gas upstream side of the substrate coated with the lower-layer Pd layer, and unnecessary components were blown away using a blower to coat the surface of the lower-layer Pd layer with the materials. At such time, the coating length was adjusted to 67 mm relative to the substrate length. Thereafter, the [slurry 2] was used for forming a coating having a length of 17 mm from one end on the exhaust gas downstream side of the substrate. The amounts of coating materials were adjusted as follows relative to the substrate volume: 0.4 g/l of Rh, 2.6 g/l of Pd, 30 g/l of Al$_2$O$_3$(Material 1), 60 g/l of ACZ (Material 2), and 10 g/l of CZ (Material 3). Thus, an upper-layer Rh layer was formed. In the end, the resultant was dried in a dryer maintained at 120° C. for 2 hours and then calcined in an electric furnace at 500° C. for 2 hours.

At such time, the amount of Pd disposed on the exhaust gas upstream side of the upper-layer Rh layer was 3.3 g/l-67 mm. Note that since Pd is uniformly present within an area extending over a length of 67 mm from one end on the exhaust gas upstream side of the upper-layer Rh layer, the proportion of the amount of Pd existing in a layer up to 50% of the upper layer in a thickness direction from the surface of the upper layer being relatively remote from the surface of the substrate is 50% by mass.

Comparative Example 5

Lower-layer Pd layer Pd (0.5)/ACZ (50)+Al$_2$O$_3$ (45)+Ba sulfate (5)

Upper-layer Rh layer: Rh (0.4)/ACZ (60)+Al$_2$O$_3$ (30)+CZ (10)+Pd (2.6 g/l) (Pd: 2.6 g/l-84 mm from one end on the upstream side)

In the step of forming an upper-layer Rh layer in Comparative Example 1, a suspension [Slurry 6] was prepared by introducing Rh nitrate, Pd nitrate, Al$_2$O$_3$(Material 1), ACZ (Material 2), CZ (Material 3), and an Al$_2$O$_3$-based binder. The [Slurry 6] was introduced from one end on the exhaust gas upstream side of the substrate coated with the lower-layer Pd layer, and unnecessary components were blown away using a blower to coat the surface of the lower-layer Pd layer with the materials. At such time, the coating length was adjusted to 84 mm relative to the substrate length. The amounts of coating materials were adjusted as follows relative to the substrate volume: 0.4 g/l of Rh, 2.6 g/l of Pd, 30 g/l of Al$_2$O$_3$(Material 1), 60 g/l of ACZ (Material 2), and 10 g/l of CZ (Material 3). Thus, an upper-layer Rh layer was formed. In the end, the resultant was dried in a dryer maintained at 120° C. for 2 hours and then calcined in an electric furnace at 500° C. for 2 hours.

At such time, the amount of Pd disposed on the upper-layer Rh layer was 2.6 g/l-84 mm. Note that since Pd is uniformly present within an area extending over a length of 84 mm from one end on the exhaust gas upstream side of the upper-layer Rh layer, the proportion of the amount of Pd existing in a layer up to 50% of the upper layer in a thickness direction from the surface of the upper layer being relatively remote from the surface of the substrate is 50% by mass.

Example 1

Lower-layer Pd layer: Pd (0.5)/ACZ (50)+Al$_2$O$_3$ (45)+Ba sulfate (5)

Upper-layer Rh layer: Rh (0.4)/ACZ (60)+Al$_2$O$_3$ (30)+CZ (10)+Pd (2.6 g/l (the carried catalyst density calculated based on the substrate as a whole; the same applies below)) (uppermost surface Pd layer: 11 g/l-20 mm from one end on the upstream side (the carried catalyst density calculated based on the substrate volume of a portion with a length of 20 mm or less carrying Pd is described as above; the same applies below))

The upper-layer Rh layer dried and calcined in Comparative Example 1 was allowed to absorb a Pd nitrate solution from one end on the exhaust gas upstream side of the substrate, and unnecessary components were blown away using a blower to have Pd carried on the upper-layer Rh layer. Thus, an uppermost surface Pd layer was formed. At such time, the width of the uppermost surface Pd layer was adjusted to 20 mm relative to the substrate length. In the end, the resultant was dried in a dryer maintained at 120° C. for 2 hours and then calcined in an electric furnace at 500° C. for 2 hours.

At such time, the amount of Pd disposed on the uppermost surface Pd layer was 11 g/l-20 mm (upper-layer Rh layer: 2.6 g/l). Note that conditions were adjusted such that when pH of the Pd nitrate solution was set to less than 1, the proportion of the amount of Pd existing in the surface layer became about 65% by mass.

Example 2

Lower-layer Pd layer: Pd (0.5)/ACZ (50)+Al$_2$O$_3$ (45)+Ba sulfate (5)

Upper-layer Rh layer: Rh (0.4)/ACZ (60)+Al$_2$O$_3$ (30)+CZ (10)+Pd (2.6 g/l) (uppermost surface Pd layer: 11 g/l-20 mm from one end on the upstream side)

The upper-layer Rh layer dried and calcined in Comparative Example 1 was allowed to absorb a Pd nitrate solution from one end on the exhaust gas upstream side of the substrate, and unnecessary components were blown away using a blower to have Pd carried on the upper-layer Rh layer. Thus, an uppermost surface Pd layer was formed. At such time, the width of the uppermost surface Pd layer was adjusted to 20 mm relative to the substrate length. In the end, the resultant was dried in a dryer maintained at 120° C. for 2 hours and then calcined in an electric furnace at 500° C. for 2 hours.

At such time, the amount of Pd disposed on the uppermost surface Pd layer was 11 g/l-20 mm (upper-layer Rh layer: 2.6 g/l). Note that conditions were adjusted such that when pH of the Pd nitrate solution was set to 1 to 2, the proportion of the amount of Pd existing in the surface layer became about 85% by mass.

Example 3

Lower-layer Pd layer: Pd (0.5)/ACZ (50)+Al$_2$O$_3$ (45)+Ba sulfate (5)

Upper-layer Rh layer: Rh (0.4)/ACZ (60)+Al$_2$O$_3$ (30)+CZ (10)+Pd (2.6 g/l) (uppermost Pd layer: 7.4 g/l-30 mm from one end on the upstream side)

The upper-layer Rh layer dried and calcined in Comparative Example 1 was allowed to absorb a Pd nitrate solution from one end on the exhaust gas upstream side of the substrate, and unnecessary components were blown away using a blower to have Pd carried on the upper-layer Rh layer. Thus, an uppermost surface Pd layer was formed. At such time, the width of the uppermost surface Pd layer was adjusted to 30 mm relative to the substrate length. In the end, the resultant was dried in a dryer maintained at 120° C. for 2 hours and then calcined in an electric furnace at 500° C. for 2 hours.

At such time, the amount of Pd disposed on the uppermost surface Pd layer was 7.4 g/l-30 mm (upper-layer Rh layer: 2.6 g/l). Note that conditions were adjusted such that when pH of the Pd nitrate solution was set to 1 to 2, the proportion of the amount of Pd existing in the surface layer became about 85% by mass.

Example 4

Lower-layer Pd layer: Pd (0.5)/ACZ (50)+Al$_2$O$_3$ (45)+Ba sulfate (5)

Upper-layer Rh layer: Rh (0.4)/ACZ (60)+Al$_2$O$_3$ (30)+CZ (10)+Pd (2.6 g/l) (uppermost Pd layer: 4.9 g/l-45 mm from one end on the upstream side)

The upper-layer Rh layer dried and calcined in Comparative Example 1 was allowed to absorb a Pd nitrate solution from one end on the exhaust gas upstream side of the substrate, and unnecessary components were blown away using a blower to have Pd carried on the upper-layer Rh layer. Thus, an uppermost surface Pd layer was formed. At such time, the width of the uppermost surface Pd layer was adjusted to 45 mm relative to the substrate length. In the end, the resultant was dried in a dryer maintained at 120° C. for 2 hours and then calcined in an electric furnace at 500° C. for 2 hours.

At such time, the amount of Pd disposed on the uppermost surface Pd layer was 4.9 g/l-45 mm (upper-layer Rh layer: 2.6 g/l). Note that conditions were adjusted such that when pH of the Pd nitrate solution was set to 1 to 2, the proportion of the amount of Pd existing in the surface layer became about 85% by mass.

Example 5

Lower-layer Pd layer: Pd (0.5)/ACZ (50)+Al$_2$O$_3$ (45)+Ba sulfate (5)

Upper-layer Rh layer: Rh (0.4)/ACZ (60)+Al$_2$O$_3$ (30)+CZ (10)+Pd (2.6 g/l) (uppermost Pd layer: 3.3 g/l-67 mm from one end on the upstream side)

The upper-layer Rh layer dried and calcined in Comparative Example 1 was allowed to absorb a Pd nitrate solution from one end on the exhaust gas upstream side of the substrate, and unnecessary components were blown away using a blower to have Pd carried on the upper-layer Rh layer. Thus, an uppermost surface Pd layer was formed. At such time, the width of the uppermost surface Pd layer was adjusted to 67 mm relative to the substrate length. In the end, the resultant was dried in a dryer maintained at 120° C. for 2 hours and then calcined in an electric furnace at 500° C. for 2 hours.

At such time, the amount of Pd disposed on the uppermost surface Pd layer was 3.3 g/l-67 mm (upper-layer Rh layer: 2.6 g/l). Note that conditions were adjusted such that when pH of the Pd nitrate solution was set to 1 to 2, the proportion of the amount of Pd existing in the surface layer became about 85% by mass.

Example 6

Lower-layer Pd layer: Pd (0.5)/ACZ (50)+Al$_2$O$_3$ (45)+Ba sulfate (5)

Upper-layer Rh layer: Rh (0.4)/ACZ (60)+Al$_2$O$_3$ (30)+CZ (10)+Pd (2.6 g/l) (uppermost Pd layer: 2.6 g/l-84 mm from one end on the upstream side)

The upper-layer Rh layer dried and calcined in Comparative Example 1 was allowed to absorb a Pd nitrate solution from one end on the exhaust gas upstream side of the substrate, and unnecessary components were blown away using a blower to have Pd carried on the upper-layer Rh layer. Thus, an uppermost surface Pd layer was formed. At such time, the width of the uppermost surface Pd layer was adjusted to 84 mm relative to the substrate length. In the end, the resultant was dried in a dryer maintained at 120° C. for 2 hours and then calcined in an electric furnace at 500° C. for 2 hours.

At such time, the amount of Pd disposed on the uppermost surface Pd layer was 2.6 g/l-84 mm (upper-layer Rh layer: 2.6 g/l). Note that conditions were adjusted such that when pH of the Pd nitrate solution was set to 1 to 2, the proportion of the amount of Pd existing in the surface layer became about 85% by mass.

<II. Method for Evaluation of Catalyst>

[II-1. Physical Property Evaluation]

Physical property evaluation was carried out by cutting catalysts (after the tolerance test) into pieces of given sizes, embedding the catalyst pieces in resin, polishing, vapor-depositing Au thereon, and evaluating the subjects using FE-EPMA (JXA-8530F, JEOL).

Specifically, the amount of Pd existing in the surface layer was determined by observing the catalyst coating layer using FE-EPMA, conducting Pd line analysis of a cross section of the catalyst coating layer in a thickness direction, and determining the amount of Pd existing in the surface layer based on the amount of Pd in the uppermost surface Pd layer and the amount of Pd existing in the upper half of the upper layer obtained by multiplying the Pd element existing in the layer up to 50% of the upper layer in a thickness direction from the surface.

[II-2. Tolerance Test]

Catalysts were subjected to the tolerance test using actual engines. Specifically, the tolerance test was performed by mounting the catalysts on the exhaust systems of V-shaped 8-cylinder engines, and repeatedly applying exhaust gas in a stoichiometric atmosphere and in a lean atmosphere at given intervals over a period of 50 hours at catalyst bed temperature of 950° C.

[II-3. Property Evaluation]

Catalyst Activity was Evaluated Using L-4 Engines.

(1) Evaluation of warm-up performance (W. U.): The exhaust gas with an air-fuel ratio (A/F) of 14.4 was applied, a gas was introduced under Ga conditions (Ga=16 g/s), and the time required to allow HC to reach T50 (50% purification rate) was evaluated.

(2) Temperature property evaluation: The exhaust gas with an air-fuel ratio (A/F) of 14.4 was applied, and temperature-increasing properties (up to 500° C.) under high Ga conditions (Ga=35 g/s) were evaluated. Catalyst activity was evaluated on the basis of the rate of purification when the temperature of the introduced gas reached 500° C.

<III. Results of Catalyst Evaluation>

The results of catalyst evaluation obtained as a result of [II-1. Physical property evaluation] and [II-3. Property evaluation] above are shown in Table 1.

Figure 4:
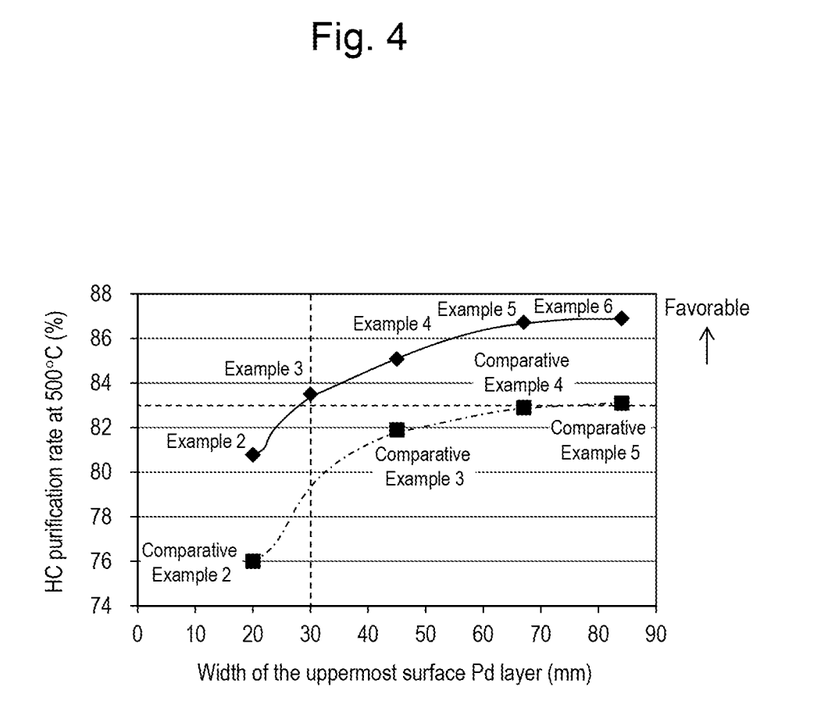
FIG. 4 shows a relationship between the width of the uppermost surface Pd layer and the HC purification ratio in Examples 2 to 6 and Comparative Examples 2 to 5 after the tolerance test.

FIG. 4 shows a relationship between the width of the uppermost surface Pd layer and the HC purification ratio for the catalysts of Examples 2-6 and Comparative Examples 2-5 after the tolerance test. As is understood from FIG. 4, as the width of the uppermost surface Pd layer increases, HC purification capacity improves, and catalysts of the Examples in which the proportion of the amount of Pd existing in the surface layer is large have improved HC purification capacity as compared with the corresponding Comparative Examples.

TABLE 1

| No. | | Position for adding Pd in the upper layer | Width of the uppermost surface Pd layer in the upper layer (mm) | Proportion of the amount of Pd existing in the surface layer (% by mass) | Warm-up performance T50-HC (sec) | HC purification rate (%) 500° C. |
|---|---|---|---|---|---|---|
| 1 | Comparative Example 1 | No addition | — | 0 | 19.5 | 71.8 |
| 2 | Comparative Example 2 | Pd disposed uniformly | 20 | 50 | 13.8 | 76.0 |
| 3 | Comparative Example 3 | Pd disposed uniformly | 45 | 50 | 14.8 | 81.9 |
| 4 | Comparative Example 4 | Pd disposed uniformly | 67 | 50 | 15.1 | 82.9 |
| 5 | Comparative Example 5 | Pd disposed uniformly | 84 | 50 | 15.5 | 83.1 |
| 6 | Example 1 | Mainly in the surface layer | 20 | 65 | 12.4 | 79.2 |
| 7 | Example 2 | Mainly in the surface layer | 20 | 84 | 12.0 | 80.8 |
| 8 | Example 3 | Mainly in the surface layer | 30 | 84 | 12.1 | 83.5 |
| 9 | Example 4 | Mainly in the surface layer | 45 | 84 | 13.2 | 85.1 |
| 10 | Example 5 | Mainly in the surface layer | 67 | 84 | 14.4 | 86.7 |
| 11 | Example 6 | Mainly in the surface layer | 84 | 84 | 14.9 | 86.9 |

Figure 2:
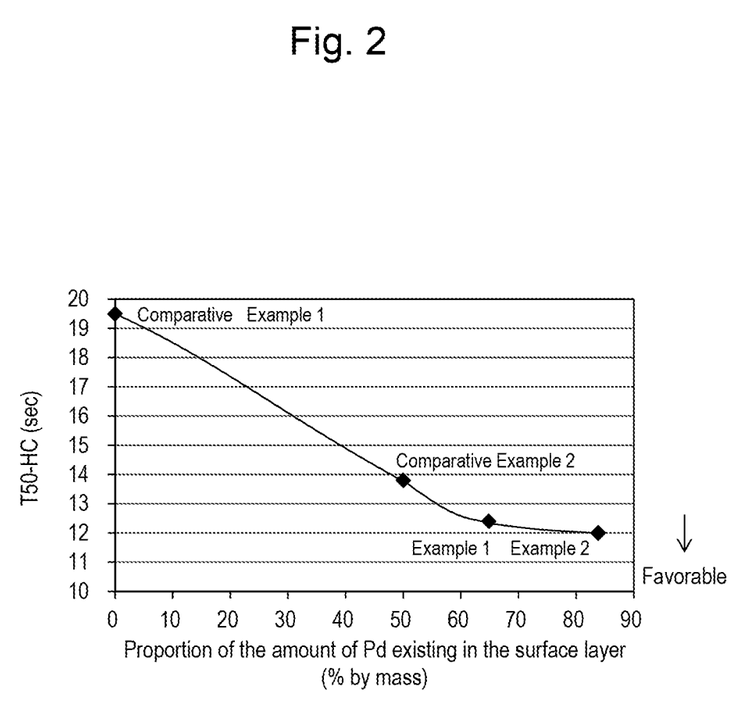
FIG. 2 shows a relationship between the proportion of the amount of Pd existing in the surface layer and time required for achieving the HC 50% purification ratio in Examples 1 and 2 and Comparative Examples 1 and 2 after the tolerance test.

FIG. 2 shows a relationship between the proportion of the amount of Pd existing in the surface layer and time required for achieving the HC 50% purification ratio for the catalysts of Examples 1 and 2 and Comparative Examples 1 and 2 after the tolerance test. As is understood from FIG. 2, the addition of Pd to the upper layer allows warm-up performance to improve as the proportion of Pd existing in the surface layer increases.

Figure 3:
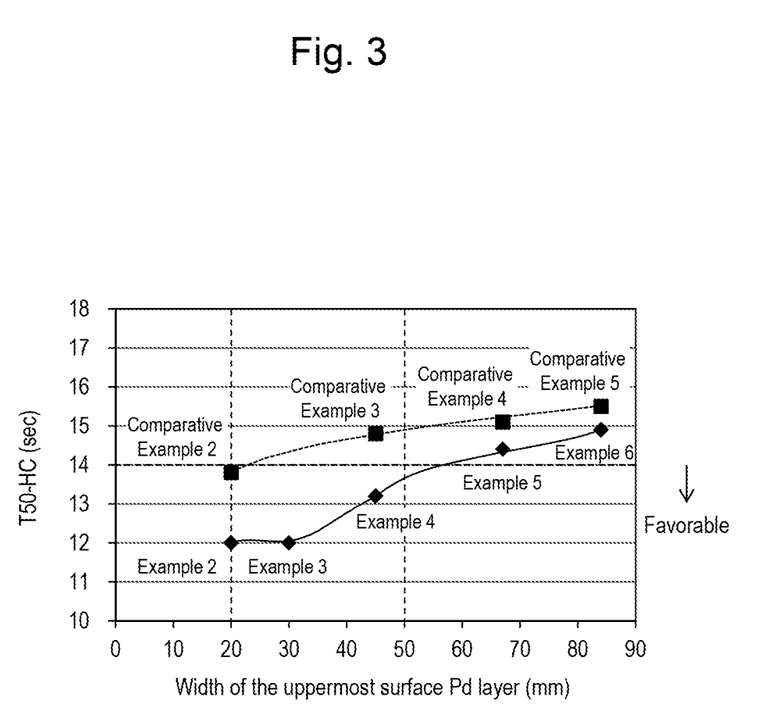
FIG. 3 shows a relationship between the width of the uppermost surface Pd layer and time required for achieving the HC 50% purification ratio in Examples 2-6 and Comparative Examples 2-5 after the tolerance test.

FIG. 3 shows a relationship between the width of the uppermost surface Pd layer and time required for achieving the HC 50% purification ratio for the catalysts of Examples 2-6 and Comparative Examples 2-5 after the tolerance test. As is understood from FIG. 3, as the width of the uppermost surface Pd layer decreases, warm-up performance improves, and catalysts of the Examples in which the proportion of the amount of Pd existing in the surface layer is large have improved warm-up performance as compared with the corresponding Comparative Examples.

The exhaust gas purification catalyst of the exemplary embodiments can be applied particularly to an exhaust gas purification catalyst of an automobile.

The present specification includes contents described in the specification and/or drawings of Japanese patent application No. 2017-195646 to which the present application claims priority.

All publications, patent and patent applications cited herein are incorporated herein by reference in their entirety.

What is claimed is:

1. An exhaust gas purification catalyst, the exhaust gas purification catalyst comprising:
   a substrate, and
   a catalyst coating layer formed on a surface of the substrate, wherein
   the catalyst coating layer comprises an upper layer and a lower layer, the lower layer being closer to the surface of the substrate and the upper layer being relatively remote from the surface of the substrate, the upper layer of the catalyst coating layer comprises Rh, Pd, and a carrier, the upper layer of the catalyst coating layer further comprises an uppermost surface Pd layer, the uppermost surface Pd layer being disposed within an area extending over a length of 20 mm or more from one end on an upstream side in a downstream direction on a surface of the upper layer of the catalyst coasting layer, the uppermost surface Pd layer having a Pd concentration that is relatively higher than that of any other portion in the upper layer of the catalyst coasting layer, the lower layer of the catalyst coating layer comprises a carrier, and at least one noble metal selected from the group of Pd and Pt, the uppermost surface Pd layer comprises 60% or more of Pd by mass in a region comprising up to 50% of the upper layer of the catalyst coating layer in a thickness direction from a surface of the uppermost surface Pd layer which is relatively remote from the surface of the substrate.

2. The exhaust gas purification catalyst according to claim 1, wherein the uppermost surface Pd layer extends over a length of 30 mm to 50 mm from the one end on the upstream side in the downstream direction on the surface of the upper layer of the catalyst coating layer.

3. The exhaust gas purification catalyst according to claim 2, wherein the uppermost surface Pd layer comprises 80% or more of Pd by mass in the region comprising up to 50% of the upper layer of the catalyst coating layer in the thickness direction from the surface of the uppermost surface Pd layer which is relatively remote from the surface of the substrate.

4. The exhaust gas purification catalyst according to claim 1, wherein the uppermost surface Pd layer comprises 80% or more of Pd by mass in the region comprising up to 50% of the upper layer of the catalyst coating layer in the thickness direction from the surface of the uppermost surface Pd layer which is relatively remote from the surface of the substrate.

* * * * *